(12) United States Patent
Mizuno et al.

(10) Patent No.: US 9,023,506 B2
(45) Date of Patent: May 5, 2015

(54) BATTERY SEPARATOR, AND BATTERY SEPARATOR MANUFACTURING METHOD

(71) Applicant: Toray Battery Separator Film Co., Ltd., Nasushiobara-shi (JP)

(72) Inventors: Naoki Mizuno, Nasushiobara (JP); Michihiko Irie, Nasushiobara (JP); Masanori Nakamura, Nasushiobara (JP); Ken Shimizu, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 0 days.

(21) Appl. No.: 14/237,941

(22) PCT Filed: Feb. 8, 2013

(86) PCT No.: PCT/JP2013/053107
§ 371 (c)(1),
(2) Date: Feb. 10, 2014

(87) PCT Pub. No.: WO2013/122010
PCT Pub. Date: Aug. 22, 2013

(65) Prior Publication Data
US 2014/0349169 A1    Nov. 27, 2014

(30) Foreign Application Priority Data

Feb. 15, 2012 (JP) ................. 2012-030179
Feb. 15, 2012 (JP) ................. 2012-030180

(51) Int. Cl.
*H01M 2/14* (2006.01)
*H01M 2/16* (2006.01)
*H01M 10/052* (2010.01)

(52) U.S. Cl.
CPC ............ *H01M 2/1686* (2013.01); *H01M 2/145* (2013.01); *H01M 2/166* (2013.01); *H01M 10/052* (2013.01)

(58) Field of Classification Search
CPC ............ B32B 2457/10; B32B 2255/10; B32B 2255/26; B32B 2307/306; B32B 27/08; H01M 2/145; H01M 2/1653; H01M 2300/0094
USPC .......................................................... 429/145
IPC ......................................................... H01M 2/16
See application file for complete search history.

(56) References Cited

U.S. PATENT DOCUMENTS

2010/0233547 A1* 9/2010 Baba et al. .................... 429/246

FOREIGN PATENT DOCUMENTS

| JP | 2001-023602 | A | | 1/2001 |
|----|-------------|---|---|--------|
| JP | 2001-266942 | A | | 9/2001 |
| JP | 2003-171495 | A | | 6/2003 |
| JP | 2005-281668 | A | | 10/2005 |
| JP | 2006-289657 | A | | 10/2006 |
| JP | 2006-338917 | A | | 12/2006 |
| JP | 2007-125821 | A | | 5/2007 |
| JP | 2012-043762 | | * | 3/2012 |
| JP | 2012-043762 | A | | 3/2012 |
| WO | 2011/161837 | A1 | | 12/2011 |
| WO | 2012/029698 | A1 | | 3/2012 |
| WO | 2012/029699 | A1 | | 3/2012 |

* cited by examiner

*Primary Examiner* — Basia Ridley
*Assistant Examiner* — Heng Chan
(74) *Attorney, Agent, or Firm* — DLA Piper LLP (US)

(57) ABSTRACT

A battery separator includes a porous membrane A with a thickness of less than 10 μm including a polypropylene resin, and a porous membrane B laminated thereon including a heat resistant resin and inorganic particles or cross-linked polymer particles, wherein the porous membrane A satisfies a specific range of thickness, average pore size, and porosity, and the entire battery separator satisfies a specific range of thickness, peeling strength at the interface between the porous membrane A and the porous membrane B, and difference in air resistance between the entire battery separator and the porous membrane A.

5 Claims, No Drawings

BATTERY SEPARATOR, AND BATTERY SEPARATOR MANUFACTURING METHOD

TECHNICAL FIELD

The present invention relates to a battery separator comprising a heat resistant resin layer and a polypropylene porous membrane having a thickness of less than 10 μm, and particularly to a battery separator useful as a high-performance and low-cost-oriented lithium ion battery separator.

BACKGROUND ART

Thermoplastic resin microporous membranes have been widely used, for example, as a material for separation, selective permeation, and isolation of substances: e.g., battery separators used in a lithium ion secondary battery, nickel-hydrogen battery, nickel-cadmium battery, and polymer battery; separators for an electric double layer capacitor; various filters such as a reverse osmosis filtration membrane, ultrafiltration membrane, and microfiltration membrane; moisture-permeable waterproof clothing; and medical materials. In particular, polyolefin microporous membranes have been suitably used as a lithium ion secondary battery separator, because they are not only characterized by having excellent electrical insulating properties, having ion permeability due to electrolyte impregnation, and having excellent electrolyte resistance and oxidation resistance, but also have such a pore-blocking effect that excessive temperature rise is suppressed by blocking a current at a temperature of about 120 to 150° C. in abnormal temperature rise in a battery. However, when the temperature continues to rise for some reason even after pore blocking, membrane rupture can occur at a certain temperature due to decrease in viscosity of molten olefin constituting the membrane and shrinkage of the membrane. In addition, when left at a constant high temperature, membrane rupture can occur after the lapse of a certain time due to decrease in viscosity of molten polyolefin and shrinkage of the membrane. This phenomenon is not a phenomenon that occurs only when polyolefin is used, and also when other thermoplastic resins are used, this phenomenon is unavoidable at or higher than the melting point of the resin constituting the porous membrane.

In particular, separators for a lithium ion battery are highly responsible for battery properties, battery productivity, and battery safety, and required to have excellent mechanical properties, heat resistance, permeability, dimensional stability, pore-blocking properties (shutdown properties), melt rupture properties (meltdown properties), and the like. Accordingly, various studies to improve heat resistance have been conducted until now. Fluororesins which have both heat resistance and oxidation resistance have been suitably used as a heat resistant resin layer.

Further, to increase battery capacity, it is expected that membranes will become thinner and thinner in order to increase the area not only of electrodes but also of a separator that can be loaded into a container. When a porous film becomes thinner, it tends to be deformed in the planar direction, and accordingly a heat resistant resin layer may be peeled off during processing of a battery separator, a slitting process, or a battery assembly process, which makes it difficult to ensure safety.

Further, to achieve cost reduction, it is expected that the speed will be faster in a battery assembly process, and the present inventors presume that there will be a demand for even higher adhesion to withstand high-speed processing, by which troubles such as peeling-off of a heat resistant resin layer hardly occurs even in such high-speed processing. Furthermore, it is expected that there will be an increasing demand for higher processability (lower curling properties) in a battery assembly process in the future.

Patent Document 1 discloses a lithium ion secondary battery separator obtained by direct application of a polyamide-imide resin to a polyolefin porous membrane with a thickness of 25 lam to a thickness of 1 μm and immersion in water at 25° C., followed by drying.

In Patent Document 1, significant increase in air resistance was unavoidable, and, in addition, curling was large and not satisfactory.

Patent Document 2 discloses an electrolyte-supported polymer membrane obtained by immersion of a nonwoven fabric with an average thickness of 36 μm comprising aramid fibers in a dope containing a vinylidene fluoride copolymer which is a heat resistant resin, and drying.

Patent Document 3 discloses a composite porous membrane obtained by immersion of a polypropylene microporous membrane with a thickness of 25.6 μm in a dope mainly composed of polyvinylidene fluoride which is a heat resistant resin, followed by the process of a coagulation bath, washing with water, and drying.

As in Patent Document 2, in a method in which coating is performed by dipping (immersing) a nonwoven fabric comprising aramid fibers in a heat resistant resin solution, a heat resistant porous layer is formed inside and on both surfaces of the nonwoven fabric, and accordingly most of continuous pores inside the nonwoven fabric will be blocked; consequently, significant increase in air resistance is unavoidable, and besides a pore-blocking function, the most important function that determines safety of a separator, cannot be provided.

In addition, nonwoven fabrics are difficult to thin as compared to polyolefin porous membranes, and therefore are not suitable for increase in battery capacity which is expected to progress in the future.

Also in Patent Document 3, a heat resistant porous layer is similarly formed inside and on both surfaces of a polypropylene microporous membrane. As in Patent Document 2, significant increase in air resistance is unavoidable, and it is difficult to obtain a pore-blocking function.

Patent Document 4 discloses a separator having a heat resistant porous layer comprising para-aramid obtained in such a manner that, when a solution of para-aramid resin which is a heat resistant resin is applied to a polyethylene porous film with a thickness of 25 μm, the polyethylene porous film is impregnated in advance with a polar organic solvent used in the heat resistant resin solution in order to avoid significant increase in air resistance, and after the heat resistant resin solution is applied, the polyethylene porous film is made into a white opaque membrane in a thermo-hygrostat set at a temperature of 30° C. and a relative humidity of 65%, and then washed and dried.

In Patent Document 4, there is no significant increase in air resistance, but adhesion between the polyethylene porous film and the heat resistant resin is extremely low. Particularly when the thickness of the polyethylene porous film is less than 10 μm, the film tends to be deformed in the planar direction, and accordingly the heat resistant resin layer may be peeled off in a battery assembly process, which makes it difficult to ensure safety.

Patent Document 5 discloses a composite porous membrane obtained in such a manner that a propylene film is coated with a polyamide-imide resin solution and passed through an atmosphere at 25° C. and 80% RH over 30 seconds to obtain a semi-gel like porous membrane; then a polyethylene porous film with a thickness of 20 μm or 10 μm is laminated onto the semi-gel like porous membrane, immersed in an aqueous solution containing N-methyl-2-pyrrolidone (NMP), and then washed with water and dried. However, curling was not satisfactory.

Further, in Patent Document 5, there is no significant increase in air resistance, but adhesion between the polyethylene porous film and the heat resistant resin is extremely low. Similarly to Patent Document 4, particularly when the thickness of the polyethylene porous film is less than 10 μm, the heat resistant resin layer may be peeled off, which makes it difficult to ensure safety.

As described above, in a battery separator in which a heat resistant resin layer is laminated on a porous membrane based on polyolefin or the like that serves as a substrate, when the heat resistant resin is infiltrated into the porous membrane that serves as a substrate to improve the adhesion of the heat resistant resin layer, the amount of air resistance increase is large. When the infiltration of the heat resistant resin is reduced, the amount of air resistance increase can be kept small, but the adhesion of the heat resistant resin layer decreases. In particular, with separators becoming thinner, in light of the speed-up in a battery assembly process, it becomes difficult to ensure safety and productivity, the demand for which will be increasingly greater. In particular, as the thickness of the polyolefin porous membrane that serves as a substrate becomes thin, it becomes more difficult to ensure low curling properties.

In other words, there has not been a battery separator that has low curling properties and a balance between adhesion of a heat resistant resin layer and the amount of air resistance increase, in which battery separator the thickness of a polyolefin porous membrane that serves as a substrate is less than 10 μm. As the thickness of a porous membrane based on polyolefin or the like that serves as a substrate becomes thinner, it becomes more and more difficult to achieve a balance between adhesion of a heat resistant resin layer and the amount of air resistance increase.

PRIOR ART DOCUMENTS

Patent Documents

Patent Document 1: JP 2005-281668 A
Patent Document 2: JP 2001-266942 A
Patent Document 3: JP 2003-171495 A
Patent Document 4: JP 2001-23602 A
Patent Document 5: JP 2007-125821 A

SUMMARY OF THE INVENTION

Problems to be Solved by the Invention

The present inventors, on the assumption that battery separators become thinner and thinner and their cost is further reduced in the future, aim to provide a battery separator that has low curling properties and a balance between excellent adhesion of a heat resistant resin layer and a small amount of air resistance increase, and is suitable for increase in battery capacity, excellent ion permeability, and high-speed processability in a battery assembly process; in particular, a battery separator suitable as a lithium ion secondary battery separator.

Means for Solving the Problems

To solve the problems described above, the present invention has the following constitution.

(1) A battery separator, comprising: a porous membrane A comprising a polypropylene resin, and a porous membrane B laminated thereon comprising a heat resistant resin and inorganic particles or cross-linked polymer particles, wherein the porous membrane A satisfies expressions (a) to (c), and the entire battery separator satisfies expressions (d) to (f).

$$t(A) < 10 \text{ μm} \qquad \text{Expression (a)}$$

wherein t (A) is a thickness of the porous membrane A;

$$0.01 \text{ μm} \leq R(A) \leq 1.0 \text{ μm} \qquad \text{Expression (b)}$$

wherein R (A) is an average pore size of the porous membrane A;

$$30\% \leq V(A) \leq 70\% \qquad \text{Expression (c)}$$

wherein V (A) is a porosity of the porous membrane A:

$$t(T) \leq 13 \text{ μm} \qquad \text{Expression (d)}$$

wherein t (T) is a thickness of the entire battery separator;

$$F(A/B) \geq 1.0 \text{ N/25 mm} \qquad \text{Expression (e)}$$

wherein F (A/B) is a peeling strength at the interface between the porous membrane A and the porous membrane B; and $$20 \leq Y - X < 100 \qquad \text{Expression (f)}$$

wherein X is an air resistance (sec/100 cc Air) of the porous membrane A, and
Y is an air resistance (sec/100 cc Air) of the entire battery separator.

(2) The battery separator according to (1), wherein the battery separator has an air resistance of 50 to 600 sec/100 cc Air.

(3) The battery separator according to (1) or (2), wherein the heat resistant resin comprises a polyamide-imide resin, a polyimide resin, or a polyamide resin.

(4) The battery separator according to (1) or (2), wherein the heat resistant resin comprises a fluororesin.

(5) A process for producing the battery separator according to any one of (1) to (4), comprising the following steps (i) and (ii).

Step (i): applying a varnish comprising a heat resistant resin and inorganic particles or cross-linked polymer particles to a porous membrane A comprising a polypropylene resin, and then passing the porous membrane A through a low humidity zone at an absolute humidity of not less than 0.5 g/m$^3$ and less than 6.0 g/m$^3$ and a high humidity zone at an absolute humidity of not less than 7.0 g/m$^3$ and less than 25.0 g/m$^3$ to form a heat resistant resin membrane on the porous membrane A; and Step (ii): immersing the composite membrane obtained in the step (i), in which the heat resistant resin membrane is laminated, in a coagulation bath to convert the heat resistant resin membrane into a porous membrane B, and washing and drying the porous membrane B to obtain a battery separator.

Effects of the Invention

In the present invention, the heat resistant resin layer and the polypropylene porous membrane have excellent adhesion, and even when the heat resistant resin layer is laminated, the amount of air resistance increase (which hereinafter may be abbreviated as the amount of air resistance increase) is small compared to the air resistance of the polypropylene porous membrane alone. Thus, the battery separator of the present invention has excellent heat resistance and, at the same time, excellent ion permeability. Further, the battery separator of the present invention is characterized by having excellent adhesion between the polypropylene porous membrane, a substrate, and the porous membrane comprising the heat resistant resin layer and inorganic particles or cross-linked polymer particles (which hereinafter may be referred to simply as adhesion of the porous membrane comprising the heat resistant resin layer, adhesion of the porous membrane B, or simply as adhesion), and excellent processability (low curling properties) in a battery assembly process.

DESCRIPTION OF EMBODIMENTS

In the present invention, when laminating a heat resistant resin layer on a polypropylene porous membrane having a thickness of less than 10 μm, an advanced processing technique was used to provide excellent adhesion of the heat resistant resin layer due to appropriately formed anchoring of the heat resistant resin layer without causing significant increase in air resistance.

"Significant increase in air resistance" herein means that the difference between an air resistance (X) of the porous membrane A that serves as a substrate and an air resistance (Y) of the entire battery separator is more than 100 sec/100 cc Air.

The summary of the battery separator of the present invention will be described, but the present invention is, of course, not limited to this representative example.

The battery separator of the present invention is a battery separator comprising a composite porous membrane comprising a porous membrane A and a porous membrane B laminated thereon.

First, the porous membrane A used in the present invention will be described.

The porous membrane A comprises at least one layer, and at least one of its outermost layers comprises a polypropylene resin. Such a porous membrane A can be prepared by the stretching pore-forming process or the phase separation method.

The phase separation method is a method comprising melt-blending, for example, polypropylene with a solvent for film formation, extruding the resulting molten mixture through a die, cooling the extrudate to form a gel-like product, stretching the gel-like product obtained in at least one direction, and removing the solvent for film formation to obtain a porous membrane. The stretching pore-forming process is a method in which, for example, a lamellar structure in a sheeted film before stretching is controlled by employing low temperature extrusion and a high draft ratio in melt extrusion of polypropylene, and the film is uniaxially stretched to cause cleavages at lamellar interfaces to thereby form voids (i.e., lamella stretching method). Further, a method has also been proposed comprising adding, for example, to polypropylene a large amount of inorganic particles or resin particles incompatible with polypropylene to form a sheet, and stretching the sheet to cause cleavages at interfaces between the particles and the polypropylene resin to thereby form voids. Another example is, for example, the β-crystal method in which β-crystals with low crystal density (crystal density: 0.922 g/cm$^3$) are formed when forming an unstretched sheet by melt extrusion of polypropylene; the sheet is stretched to thereby cause crystal transition to α-crystals with high crystal density (0.936 g/cm$^3$); and pores are formed by the difference in crystal density between the two. In this β-crystal method, to form a large number of pores in a stretched film, it is necessary to selectively form a large amount of β-crystals in an unstretched sheet before stretching. Therefore, in this β-crystal method, it is important to form β-crystals under specific melt crystallization conditions using a β-crystal nucleating agent. As a β-crystal nucleating agent, in addition to quinac- ridone compounds which have long been used, materials having an even higher β-crystal forming ability have been proposed.

The porous membrane A may be a monolayer membrane or a multilayer membrane composed of two or more layers (e.g., polypropylene/polyethylene/polypropylene) different in molecular weight, average pore size, or thermal properties. When the porous membrane A has a layer structure of polypropylene/polyethylene/polypropylene, the thickness of one polypropylene layer is preferably 2.0 μm or more. When the lower limit of the thickness of the polypropylene layer is in this preferred range, sufficient mechanical strength is provided.

When the porous membrane A is a monolayer membrane, examples of the production method include the phase separation method and the stretching pore-forming process described above. When the porous membrane A is a multilayer membrane of two or more layers, it is only required that at least one surface layer be a polypropylene layer, and components of the other layer are not critical. When the porous membrane A is a multilayer membrane of two or more layers, it can be produced by a method comprising melt-blending each of the polyolefins constituting, for example, an A1 layer and an A2 layer with a solvent for film formation, feeding the resulting molten mixtures from each extruder to one die to integrate gel sheets constituting each component, and co-extruding the integrated gel sheets, or a method comprising laminating gel sheets constituting each layer and heat-fusing the laminate. The co-extrusion method is preferred because a high interlayer adhesive strength is easily achieved; high permeability is easily maintained because continuous pores are easily formed between layers; and productivity is high.

Further, the polypropylene resin in the porous membrane A preferably has a mass average molecular weight (Mw) of 300,000 or more, more preferably 400,000 or more, and still more preferably 500,000 or more, in terms of process workability and mechanical strengths to withstand various external pressures caused when wound around an electrode, such as tensile strength, elastic modulus, elongation, and pin puncture strength. The upper limit of the Mw is preferably 4,000,000 or less, more preferably 3,000,000 or less. When the upper limit of the Mw of the polypropylene resin in the porous membrane A is in this preferred range, excellent fluidity during melt extrusion is provided, and it is easy to form a sheet. The molecular weight distribution (Mw/Mn), the ratio of Mw to number average molecular weight (Mn), of polypropylene is not critical, but is preferably 1.01 to 100, more preferably 1.1 to 50.

In the present invention, a porous membrane having a polypropylene resin layer as an outermost layer is used as a substrate membrane, and the polypropylene resin may contain other resins such as a polyethylene resin as long as it is mainly composed of the polypropylene resin. The percentage of polypropylene is not less than 50% by weight in a resin mixture. When the percentage of polypropylene is in this preferred range, the porous membrane A has excellent meltdown properties and electrolyte solution retention. The percentage of polypropylene is preferably not less than 75% by weight, more preferably not less than 90% by weight. A copolymer of propylene and other olefins may also be used. The content of propylene units is not less than 50% by weight in the copolymer. When the content of the propylene units is in this preferred range, the porous membrane A has excellent meltdown properties and electrolyte solution retention. The percentage of polypropylene is more preferably not less than 75% by weight, still more preferably not less than 90% by weight.

Preferred examples of comonomers copolymerized with propylene include unsaturated hydrocarbons; for example, ethylene, and α-olefins such as 1-butene, 1-pentene, 1-hexene, 4-methyl-1-pentene, and 1-octene.

The pattern of copolymerization may be any pattern: alternating, random, block, or graft.

The porous membrane A needs to have a function (pore-blocking function) of blocking pores in the case of abnormal charge and discharge reaction. Accordingly, the melting point (softening point) of the constituent resin is preferably 70 to 150° C., more preferably 80 to 140° C., and still more preferably 100 to 130° C. When the melting point (softening point) of the resin constituting the porous membrane A is in this preferred range, the pore-blocking function will not be activated in normal use, and, therefore, a battery will not be inoperable, while the pore-blocking function is activated before an abnormal reaction proceeds enough, and, therefore, sufficient safety can be ensured.

The porous membrane A used in the present invention has a thickness of less than 10.0 μm. The upper limit is preferably 9.5 μm, more preferably 9.0 μm. The lower limit is 5.0 μm, preferably 6.0 μm. When the thickness is thinner than 5.0 μm, membrane strength and pore-blocking function of practical use may not be provided, and when it is not less than 10.0 μm, the area per unit volume of a battery case is significantly restricted, which is not suitable for increase in battery capacity which is expected to progress in the future.

The upper limit of the air resistance of the porous membrane A is preferably 500 sec/100 cc Air, more preferably 40 sec/100 cc Air, and still more preferably 300 sec/100 cc Air; the lower limit is 50 sec/100 cc Air, preferably 70 sec/100 cc Air, and more preferably 100 sec/100 cc Air.

The upper limit of the porosity of the porous membrane A is 70%, preferably 60%, and more preferably 55%. The lower limit is 30%, preferably 35%, and more preferably 40%. When the air resistance is higher than 500 sec/100 cc Air or when the porosity is lower than 30%, sufficient charge and discharge properties, particularly, ion permeability (charge and discharge operating voltage) of a battery and the lifetime of a battery (closely related to the amount of electrolytic solution retained) are not sufficient, and when these limits are exceeded, it is likely that functions of a battery cannot be fully exerted. When the air resistance is lower than 50 sec/100 cc Air or when the porosity is higher than 70%, sufficient mechanical strength and insulation properties cannot be provided, which increases the possibility of a short circuit during charge and discharge.

The average pore size of the porous membrane A is 0.01 to 1.0 μm, preferably 0.05 to 0.5 μm, and more preferably 0.1 to 0.3 μm because it has a great influence on pore-blocking speed. When the average pore size is smaller than 0.01 μm, it is difficult to produce the anchoring effect of a heat resistant resin, and thus sufficient adhesion of the heat resistant resin may not be provided; besides it is highly likely that the air resistance significantly deteriorates in complexation. When it is larger than 1.0 μm, phenomena can occur, such as slow response of a pore-blocking phenomenon to temperature, shift of a pore-blocking temperature depending on the temperature rise rate to the higher temperature side, and the like.

Further, for the surface condition of the porous membrane A, when it has a surface roughness (arithmetic average roughness) of 0.01 to 0.5 μm, adhesion to the porous membrane B tends to be stronger. When the surface roughness (arithmetic average roughness) of the porous membrane A is in this preferred range, adhesion to the porous membrane B is sufficiently strong, and, in addition, decrease in mechanical strength of the porous membrane A or transcription of irregularities to the surface of the porous membrane B will not occur.

In the present invention, the combination of a porous membrane A comprising a resin having a glass transition temperature or melting point of not higher than 150° C. and a porous membrane B comprising a resin having a glass transition temperature or melting point of higher than 150° C. is preferred in order to have both a pore-blocking function and a thermal-rupture-resistant function that are important particularly for a lithium ion battery separator.

The porous membrane B will now be described in more detail.

The porous membrane B comprises a heat resistant resin and inorganic particles or cross-linked polymer particles. To serve to support and reinforce the porous membrane A with its heat resistance, the glass transition temperature of the constituent resin is preferably 150° C. or higher, more preferably 180° C. or higher, and still more preferably 210° C. or higher, and it is not necessary to place an upper limit. When the glass transition temperature is higher than a decomposition temperature, it is preferred that the decomposition temperature be in the above range. When the lower limit of the glass transition temperature or melting point of the resin constituting the porous membrane B is in the preferred range above, a sufficient thermal-rupture-resistant temperature can be achieved, and high safety can be ensured.

The heat resistant resin constituting the porous membrane B may be any resin as long as it has excellent heat resistance.

For example, a resin mainly composed of polyamide-imide, polyimide, polyamide, or fluororesin can be suitably used, and these resins may be used alone or in combination with other materials.

A polyamide-imide resin will be described in detail below as a first example of the heat resistant resin.

In general, a polyamide-imide resin is synthesized by a common method such as the acid chloride method using trimellitic acid chloride and diamine or the diisocyanate method using trimellitic acid anhydride and diisocyanate, and the diisocyanate method is preferred in terms of production cost.

Examples of the acid component used in the synthesis of a polyamide-imide resin include trimellitic acid anhydride (chloride), a portion of which can be replaced with other polybasic acid or anhydride thereof. Examples thereof include tetracarboxylic acids such as pyromellitic acid, biphenyltetracarboxylic acid, biphenylsulfonetetracarboxylic acid, benzophenonetetracarboxylic acid, biphenyl ether tetracarboxylic acid, ethylene glycol bistrimellitate, and propylene glycol bistrimellitate, and anhydrides thereof; aliphatic dicarboxylic acids such as oxalic acid, adipic acid, malonic acid, sebacic acid, azelaic acid, dodecane dicarboxylic acid, dicarboxypolybutadiene, dicarboxypoly(acrylonitrile-butadiene), and dicarboxypoly(styrene-butadiene); alicyclic dicarboxylic acids such as 1,4-cyclohexanedicarboxylic acid, 1,3-cyclohexanedicarboxylic acid, 4,4'-dicyclohexylmethanedicarboxylic acid, and dimer acid; and aromatic dicarboxylic acids such as terephthalic acid, isophthalic acid, diphenylsulfonedicarboxylic acid, diphenyl ether dicarboxylic acid, and naphthalenedicarboxylic acid. Among them, 1,3-cyclohexanedicarboxylic acid and 1,4-cyclohexanedicarboxylic acid are preferred in terms of electrolyte resistance. In terms of shutdown properties, dimer acid, and dicarboxypolybutadiene, dicarboxypoly(acrylonitrilebutadiene), and dicarboxypoly(styrene-butadiene) with a molecular weight of 1,000 or more are preferred.

Also, a portion of a trimellitic acid compound can be replaced with a glycol to introduce a urethane group into a molecule. Examples of glycols include alkylene glycols such as ethylene glycol, propylene glycol, tetramethylene glycol, neopentyl glycol, and hexanediol; polyalkylene glycols such as polyethylene glycol, polypropylene glycol, and polytetramethylene glycol; and polyesters with terminal hydroxyl groups synthesized from one or more of the dicarboxylic acids described above and one or more of the glycols described above, among which polyethylene glycol and polyesters with terminal hydroxyl groups are preferred in terms of a shutdown effect. The number average molecular weight of them is preferably 500 or more, more preferably 1,000 or more. The upper limit is preferably less than 8,000, but is not limited thereto.

When a portion of the acid component is replaced with at least one from the group consisting of dimer acid, polyalkylene ether, polyester, and butadiene rubber containing any one of a carboxyl group, a hydroxyl group, and an amino group at its terminal, it is preferable to replace 1 to 60 mol % of the acid component.

The diamine (diisocyanate) component used in the synthesis of a polyamide-imide resin is preferably composed of o-tolidine and tolylenediamine, and examples of the component that substitutes for a portion thereof include aliphatic diamines such as ethylenediamine, propylenediamine, and hexamethylenediamine, and diisocyanates thereof; alicyclic diamines such as 1,4-cyclohexanediamine, 1,3-cyclohexanediamine, and dicyclohexylmethanediamine, and diisocyanates thereof; and aromatic diamines such as m-phenylenediamine, p-phenylenediamine, 4,4'-diaminodiphenylmethane, 4,4'-diaminodiphenyl ether, 4,4'-diaminodiphenylsulfone, benzidine, xylylenediamine, and naphthalenediamine, and diisocyanates thereof, among which dicyclohexylmethanediamine and a diisocyanate thereof are more preferred in terms of reactivity, cost, and electrolyte resistance, and 4,4'-diaminodiphenylmethane, naphthalenediamine, and diisocyanates thereof are still more preferred. In particular, o-tolidine diisocyanate (TODI), 2,4-tolylene diisocyanate (TDI), and a blend thereof are most preferred. In order particularly to improve adhesion of the heat resistant porous membrane B, o-tolidine diisocyanate (TODI) which has high stiffness accounts for 50 mol % or more, preferably 60 mol % or more, and more preferably 70 mol % or more of total isocyanates.

A polyamide-imide resin can be readily prepared by stirring in a polar solvent such as N,N'-dimethylformamide, N,N'-dimethylacetamide, N-methyl-2-pyrrolidone, or γ-butyrolactone with heating at 60 to 200° C. In this case, an amine such as triethylamine or diethylenetriamine; an alkali metal salt such as sodium fluoride, potassium fluoride, cesium fluoride, or sodium methoxide; or the like can also be used as a catalyst as required.

When a polyamide-imide resin is used in the present invention, the polyamide-imide resin preferably has a logarithmic viscosity of 0.5 dl/g or more. When the lower limit of the logarithmic viscosity of the polyamide-imide resin is in this preferred range, sufficient meltdown properties are provided. Further, the porous membrane cannot be brittle, and a sufficient anchoring effect is produced, which leads to excellent adhesion. The upper limit is preferably lower than 2.0 dl/g in view of processability and solvent solubility.

A fluororesin will now be described in detail as a second example of the heat resistant resin.

As a fluororesin, it is preferable to use at least one selected from the group consisting of vinylidene fluoride homopolymer, vinylidene fluoride/fluorinated olefin copolymer, vinyl fluoride homopolymer, and vinyl fluoride/fluorinated olefin copolymer. Polytetrafluoroethylene is particularly preferred. These polymers have high affinity for nonaqueous electrolyte solution, proper heat resistance, and high chemical and physical stability to nonaqueous electrolyte solution, and therefore can maintain an affinity for electrolyte solution sufficiently even when used at a high temperature.

The porous membrane B is obtained by applying to a given substrate film a fluororesin solution (varnish) obtained by dissolution in a solvent that is able to dissolve a fluororesin and miscible with water, causing phase separation between the fluororesin and the solvent miscible with water under humidified conditions, and further coagulating the fluororesin by injection into a water bath (coagulation bath). A phase separation aid may optionally be added to the varnish.

Examples of solvents that can be used to dissolve the fluororesin include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, and acetonitrile, and the solvent can be arbitrarily selected depending on the solubility of resins.

The porous membrane B of the present invention is obtained by applying to a given substrate film a heat resistant resin solution (which hereinafter may be referred to as varnish) obtained by dissolution in a solvent that is able to dissolve a heat resistant resin and miscible with water, causing phase separation between the heat resistant resin and the solvent miscible with water under humidified conditions, and further coagulating the heat resistant resin by injection into a water bath (the water bath hereinafter may be referred to as a coagulation bath). A phase separation aid may optionally be added to the varnish.

Examples of solvents that can be used to dissolve the heat resistant resin include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, acetone, and acetonitrile, and the solvent can be arbitrarily selected depending on the solubility of resins.

The porous membrane B serves to support and reinforce the porous membrane A with its heat resistance. Thus, the melting point of the fluororesin constituting the porous membrane B is preferably 150° C. or higher, more preferably 180° C. or higher, and still more preferably 210° C. or higher, and the upper limit is not particularly limited. When the melting point is higher than a decomposition temperature, it is preferred that the decomposition temperature be in the above range. When the lower limit of the glass transition temperature or melting point of the fluororesin is in the preferred range above, a sufficient thermal-rupture-resistant temperature can be achieved, and high safety can be ensured.

The solids concentration of the varnish is not critical as long as the varnish can be applied uniformly, but is preferably 10% by weight to 50% by weight, more preferably 20% by weight to 45% by weight. When the solids concentration of the varnish is in this preferred range, the resulting porous membrane B cannot be brittle, and sufficient adhesion to the porous membrane B is provided.

The phase separation aid used in the present invention is at least one selected from water, alkylene glycols such as ethylene glycol, propylene glycol, tetramethylene glycol, neopentyl glycol, and hexanediol, polyalkylene glycols such as polyethylene glycol, polypropylene glycol, and polytetramethylene glycol, water-soluble polyesters, water-soluble polyurethanes, polyvinyl alcohols, carboxymethylcellulose, and the like. The phase separation aid is preferably added in an amount in the range of 10 to 90 wt %, more preferably 20 to 80 wt %, and still more preferably 30 to 70%, based on the solution weight of the varnish.

By mixing such a phase separation aid with the varnish, air resistance, surface porosity, and rate of formation of layer structure can be mainly controlled. When the amount added is less than the range described above, significant increase in phase separation rate may not be achieved. When the amount added is more than the range described above, a coating solution may become cloudy at the mixing stage, resulting in precipitation of the resin component.

It is important to add inorganic particles or cross-linked polymer particles to the varnish in order to reduce curling. Further, adding inorganic particles or cross-linked polymer particles to the varnish produces effects of preventing internal short circuit due to the growth of dendrites on an electrode inside a battery (dendrite-preventing effect), reducing the heat shrinkage rate, providing slip characteristics, and the like. The upper limit of the amount of such particles is preferably 98% by weight, more preferably 95% by weight. The lower limit is preferably 80% by weight, more preferably 85% by weight. When the amount of inorganic particles or cross-linked polymer particles added to the varnish is in this preferred range, a sufficient curling-reducing effect is produced; at the same time, the percentage of the heat resistant resin relative to the total volume of the porous membrane B is sufficient, and the resin penetrates deep into pores of the porous membrane A, resulting in sufficient adhesion to the heat resistant resin layer.

Examples of the inorganic particles include calcium carbonate, calcium phosphate, amorphous silica, crystalline glass filler, kaolin, talc, titanium dioxide, alumina, silica-alumina composite oxide particles, barium sulfate, calcium fluoride, lithium fluoride, zeolite, molybdenum sulfide, and mica.

Examples of heat resistant cross-linked polymer particles include cross-linked polystyrene particles, cross-linked acrylic resin particles, and cross-linked methyl methacrylate particles.

The average diameter of such particles is preferably 1.5 times to 50 times, more preferably 2.0 times to 20 times the average pore size of the polypropylene porous membrane A.

When the ratio of the average diameter of such particles to the average pore size of the polypropylene porous membrane A is in the preferred range above, the heat resistant resin and the particles cannot block the pores of the polypropylene porous membrane A in a mixed state, and, therefore, significant increase in air resistance is prevented; at the same time, the particles are unlikely to fall off during a battery assembly process, and, therefore, serious defects in a battery can be effectively prevented from occurring.

The thickness of the porous membrane B is preferably 1.0 to 5.0 μm, more preferably 1.0 to 4.0 μm, and still more preferably 1.0 to 3.0 μm. When the thickness of the porous membrane B is in this preferred range, membrane strength and insulation properties can be ensured when the porous membrane A melts and shrinks at or higher than its melting point. At the same time, the moderate percentage of the porous membrane A provides a sufficient pore-blocking function, and an abnormal reaction can be prevented; the size when taken up will not be too large, which is suitable for increase in battery capacity which is expected to progress in the future; and further, curling is unlikely to increase, which contributes to improved productivity in a battery assembly process.

The porosity of the porous membrane B is preferably 30 to 90%, more preferably 40 to 70%. When the porosity of the porous membrane B is in this preferred range, the electrical resistance of the membrane cannot be too high, and it is easy to apply a high current; at the same time, the membrane strength can be maintained at a high level. The air resistance of the porous membrane B, as measured by a method in accordance with JIS P 8117, is preferably 1 to 600 sec/100 cc Air, more preferably 50 to 500 sec/100 cc Air, and still more preferably 100 to 400 sec/100 cc Air. When the air resistance of the porous membrane B is in this preferred range, high membrane strength is provided, and at the same time, cycle characteristics can be maintained at a satisfactory level.

The upper limit of the total thickness of a battery separator obtained by laminating the porous membrane B is 13 μm, more preferably 12 μm. The lower limit is preferably not less than 5.0 μm, more preferably not less than 7.0 μm. When the total thickness of a battery separator obtained by laminating the porous membrane B is in this preferred range, sufficient mechanical strength and insulation properties can be easily ensured; at the same time, the amount of air resistance increase cannot be large, and the area of electrodes that can be loaded into a container can be sufficiently ensured, which results in avoidance of decrease in capacity.

The battery separator of the present invention satisfies the relation of the difference (Y−X) between an air resistance X (sec/100 cc Air) of the porous membrane A and an air resistance Y (sec/100 cc Air) of the entire battery separator: 20 sec/100 cc Air≤Y−X≤100 sec/100 cc Air. When Y−X is less than 20 sec/100 cc Air, sufficient adhesion of the heat resistant resin layer cannot be provided. When it is more than 100 sec/100 cc Air, significant increase in air resistance occurs, and, as a result, ion permeability decreases when introduced into a battery, resulting in a separator unsuitable for a high-performance battery.

Further, air resistance of the battery separator, which is one of the most important properties, is preferably 50 to 600 sec/100 cc Air, more preferably 100 to 500 sec/100 cc Air, and still more preferably 100 to 400 sec/100 cc Air. When the air resistance is in this preferred range, sufficient insulation properties are provided, and clogging of foreign substances, short circuit, and membrane rupture do not readily occur; at the same time, the membrane resistance is not too high, and charge and discharge properties and lifetime properties in a practical range are provided.

In the present invention, the peeling strength F (A/B) at the interface between the porous membrane A and the porous membrane B needs to satisfy F (A/B)≥1.0 N/25 mm. "Excellent adhesion" as used herein means that F (A/B) is 1.0 N/25 mm or more, and it is preferably 1.5 N/25 mm or more, and still more preferably 2.0 N/25 mm or more. F (A/B) means adhesion of the porous membrane B to the porous membrane A, and when it is less than 1.0 N/25 mm, the heat resistant resin layer may be peeled off during high-speed processing in the battery assembly process described above.

The process for producing the battery separator of the present invention will now be described.

The process for producing the battery separator of the present invention comprises the following steps (i) and (ii).

Step (i): applying a varnish comprising a heat resistant resin and inorganic particles or cross-linked polymer particles to a porous membrane A comprising a polypropylene resin, and then passing the porous membrane A through a low humidity zone at an absolute humidity of not less than 0.5

$g/m^3$ and less than 6.0 $g/m^3$ and a high humidity zone at an absolute humidity of not less than 7.0 $g/m^3$ and less than 25.0 $g/m^3$ to form a heat resistant resin membrane on the porous membrane A; and Step (ii): immersing the composite membrane obtained in the step (i), in which the heat resistant resin membrane is laminated, in a coagulation bath to convert the heat resistant resin membrane into a porous membrane B, and washing and drying the porous membrane B to obtain a battery separator.

A description will be given in more detail.

The porous membrane B is obtained by laminating a varnish mainly composed of a heat resistant resin solution, which is obtained by dissolution in a solvent that is able to dissolve a heat resistant resin and miscible with water, and the particles described above on a porous membrane A comprising a given polypropylene resin using a coating method to thereby form a heat resistant resin membrane, placing in a certain humidity environment before or after the lamination to cause phase separation between the heat resistant resin and the solvent miscible with water, and pouring into a water bath (coagulation bath) to coagulate the heat resistant resin membrane. The varnish may be applied directly to a porous membrane A, or a method (transcription method) may be used comprising applying the varnish once to a substrate film (e.g., polypropylene film or polyester film), placing the coated film in a certain humidity environment to cause phase separation between the heat resistant resin component and the solvent component, and then transcribing the porous membrane B onto the porous membrane A to achieve lamination.

"Low humidity zone" as used herein refers to a zone where absolute humidity is controlled to be less than 6.0 $g/m^3$, the upper limit to be preferably 4.0 $g/m^3$, more preferably 3.0 $g/m^3$, and the lower limit to be 0.5 $g/m^3$, preferably 0.8 $g/m^3$.

When the absolute humidity is less than 0.5 $g/m^3$, phase separation does not proceed sufficiently, and thus a porous membrane is less likely to be formed, which can lead to a large amount of air resistance increase. When the absolute humidity is not less than 6 $g/m^3$, the resin constituting the porous membrane B starts to coagulate in parallel with the phase separation, and the resin component constituting the porous membrane B does not infiltrate into the porous membrane A sufficiently; consequently, sufficient adhesion of the heat resistant resin is not provided. Further, when the time of passage through the low humidity zone is less than 3 seconds, the phase separation does not proceed sufficiently, and when it is more than 20 seconds, coagulation of the resin constituting the porous membrane B proceeds; which are not preferred.

The coated film is then passed through the high humidity zone over 3 seconds to 10 seconds.

"High humidity zone" as used herein refers to a zone where the lower limit of absolute humidity is controlled to be 7.0 $g/m^3$, preferably 8.0 $g/m^3$, and the upper limit to be 25 $g/m^3$, preferably 17 $g/m^3$, and more preferably 15 $g/m^3$. When the absolute humidity is less than 7.0 $g/m^3$, gelation (defluidization) does not proceed sufficiently, and therefore infiltration of the resin component constituting the porous membrane B into the porous membrane A proceeds too far, which leads to a large amount of air resistance increase. When the absolute humidity is more than 25 $g/m^3$, coagulation of the resin component constituting the porous membrane B proceeds too far, and infiltration of the resin component constituting the porous membrane B into the porous membrane A is too little; consequently, sufficient adhesion may not be provided.

For both the low humidity zone and the high humidity zone, temperature conditions are not critical as long as the absolute humidity is in the ranges described above, but a preferred range is 20° C. to 50° C. from the standpoint of energy saving.

Examples of the method of applying the varnish include reverse roll coating, gravure coating, kiss coating, roll brushing, spray coating, air knife coating, meyer bar coating, pipe doctor method, blade coating, and die coating, and these methods can be used alone or in combination.

In the coagulation bath, the resin component and the particles coagulate into three-dimensional network. The immersion time in the coagulation bath is preferably not less than 3 seconds. If it is less than 3 seconds, coagulation of the resin component may not proceed sufficiently. Although the upper limit is not limited, 10 seconds is enough.

Further, the unwashed porous membrane described above is immersed in an aqueous solution containing a good solvent for resin constituting the porous membrane B in an amount of preferably 1 to 20% by weight, more preferably 5 to 15% by weight, and the washing step using pure water and the drying step using hot air at 100° C. or lower are conducted, whereby a final battery separator can be obtained.

For the washing in wet film formation, common methods such as warming, ultrasonic irradiation, and bubbling can be used. Further, for keeping the concentration in each bath constant to increase washing efficiency, removing the solution in the porous membrane between the baths is effective. Specific examples include extruding the solution in the porous layer with air or inert gas, squeezing out the solution in the membrane physically with a guide roll, and the like.

According to the method described above, even when the porous membrane A has a thickness of less than 10 μm, a balance between adhesion and air resistance is provided, and a battery separator with a small variation in air resistance can be obtained. In the present invention, the air resistance variation is preferably 50 sec/100 cc Air or less, more preferably 40 sec/100 cc Air or less, and still more preferably 30 sec/100 cc Air or less.

For the washing in wet film formation, common methods such as warming, ultrasonic irradiation, and bubbling can be used. Further, for keeping the concentration in each bath constant to increase washing efficiency, removing the solution in the porous membrane between the baths is effective. Specific examples include extruding the solution in the porous layer with air or inert gas, squeezing out the solution in the membrane physically with a guide roll, and the like.

The battery separator of the present invention is desirably stored dry, but when it is difficult to store it absolutely dry, it is preferable to perform a vacuum drying treatment at 100° C. or lower immediately before use.

The battery separator of the present invention can be used as a separator, for example, for secondary batteries such as a nickel-hydrogen battery, a nickel-cadmium battery, a nickel-zinc battery, a silver-zinc battery, a lithium ion secondary battery, and a lithium polymer secondary battery, plastic film capacitors, ceramic capacitors, and electric double layer capacitors. In particular, the battery separator of the present invention is preferably used as a lithium ion secondary battery separator. A description will be given below with reference to a lithium ion secondary battery.

In a lithium ion secondary battery, a cathode and an anode are laminated with a separator interposed therebetween, and the separator contains an electrolytic solution (electrolyte). Structure of the electrodes is not critical and may be a known structure. For example, the structure can be an electrode structure in which a cathode and an anode in the form of a disk are arranged opposed to each other (coin-type), an electrode structure in which a cathode and an anode in the form of a flat plate are alternately laminated (laminated-type), an electrode structure in which a cathode and an anode in the form of a strip are laminated and wound (wound-type), and the like.

The cathode typically has a current collector and a cathode active material layer that is formed on the surface of the current collector and contains a cathode active material capable of occluding and releasing lithium ions. Examples of cathode active materials include inorganic compounds such as transition metal oxides, composite oxides of lithium and a transition metal (lithium composite oxides), and transition metal sulfides, and examples of transition metals include V, Mn, Fe, Co, and Ni. Preferred examples of lithium composite oxides among the cathode active materials include lithium nickel oxide, lithium cobalt oxide, lithium manganese oxide, and layered lithium composite oxides based on $\alpha$-NaFeO$_2$ structure.

The anode has a current collector and an anode active material layer that is formed on the surface of the current collector and contains an anode active material. Examples of anode active materials include carbonaceous materials such as natural graphite, artificial graphite, cokes, and carbon black. The electrolytic solution can be obtained by dissolving a lithium salt in an organic solvent. Examples of lithium salts include LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylic acid lithium salts, and LiAlCl$_4$. These may be used alone or in combination of two or more thereof. Examples of organic solvents include high-boiling and high-dielectric organic solvents such as ethylene carbonate, propylene carbonate, ethyl methyl carbonate, and $\gamma$-butyrolactone; and low-boiling and low-viscosity organic solvents such as tetrahydrofuran, 2-methyltetrahydrofuran, dimethoxyethane, dioxolane, dimethyl carbonate, and diethyl carbonate. These may be used alone or in combination of two or more thereof. In particular, high-dielectric organic solvents have high viscosity, and low-viscosity organic solvents have a low dielectric constant; therefore, it is preferable to use the two in combination.

When assembling a battery, the separator of the present invention is impregnated with an electrolytic solution. This provides the separator with ion permeability. In general, the impregnation treatment is performed by immersing a microporous porous membrane in an electrolytic solution at normal temperature. For example, in the case of assembling a cylindrical battery, a cathode sheet, a separator (composite porous membrane), and an anode sheet are first laminated in the order mentioned, and this laminate is taken up from one end to provide a wound-type electrode element. This electrode element is then inserted into a battery can and impregnated with the electrolytic solution described above, and, further, a battery lid that is provided with a safety valve and serves also as a cathode terminal is caulked via a gasket to thereby obtain a battery.

EXAMPLES

The present invention will now be described in detail by way of example, but the present invention is not limited to the examples. The measurements in the examples are values determined by the following methods.

1. Thickness

A thickness was measured using a contact thickness meter (digital micrometer M-30 manufactured by Sony Manufacturing Systems Corporation).

2. Adhesion of Porous Membrane B

Adhesive tape (available from NICHIBAN CO., LTD., No. 405; 24 mm wide) was applied to the porous membrane B surface of a separator obtained in Examples and Comparative Examples, and the separator was cut to a width of 24 mm and a length of 150 mm to prepare a test sample.

A peeling strength at the interface between a porous membrane A and a porous membrane B was measured by the peeling method (peel rate: 500 mm/min, T-peel) under the conditions of 23° C. and 50% RH using a tensile tester ("Tensilon RTM-100" manufactured by A & D Company, Limited). Measurements were made over time within 100 mm from the start to the end of the measurements, and an average value of the measurements was calculated and converted to a value per 25 mm width, which was used as a peeling strength. At the peeled interface described above, the porous membrane B surface can remain on the porous membrane A side, but also in this case a value was calculated as a peeling strength at the interface between the porous membrane A and the porous membrane B.

3. Average Pore Size

The average pore size of a porous membrane A was measured by the following method.

A test piece was fixed onto a cell for measurement using double-sided tape; platinum or gold was vacuum-deposited for several minutes; and measurements were made at an appropriate magnification. Arbitrary 10 points on an image obtained by SEM measurement were selected, and an average value of pore sizes at the 10 points was used as an average pore size of the test piece.

4. Air Resistance

Using a Gurley densometer type B manufactured by TESTER SANGYO CO., LTD., a battery separator was fixed between a clamping plate and an adapter plate such that wrinkling did not occur, and an air resistance was measured according to JIS P-8117. The sample was 10-cm square, and measuring points were the center and four corners, five points in total, of the sample; the average value was used as an air resistance (sec/100 cc Air).

When the length of a side of the sample is less than 10 cm, a value obtained by measuring air resistance at five points at intervals of 5 cm may be used.

Air resistance variation (sec/100 cc Air) was determined from the difference between the maximum value and the minimum value of the five measurements.

5. Logarithmic Viscosity

A solution obtained by dissolving 0.5 g of a heat resistant resin in 100 ml of NMP was measured at 25° C. using an Ubbelohde viscosity tube.

6. Melting Point

Using a differential scanning calorimeter (DSC) DSC 6220 manufactured by SII NanoTechnology Inc., 5 mg of a resin sample was placed in a nitrogen gas atmosphere, and the temperature was raised at a rate of 20° C./min. The peak temperature of melting peaks observed was used as a melting point.

7. Glass Transition Temperature

A resin solution or a resin solution obtained by dipping a battery separator in a good solvent to dissolve only a heat resistant resin layer was applied at an appropriate gap using an applicator to a PET film (E5001 available from TOYOBO CO., LTD.) or a polypropylene film (PYLEN-OT (registered trademark) available from TOYOBO CO., LTD.), predried at 120° C. for 10 minutes, and then peeled. The film obtained was fixed to a metal frame of an appropriate size with heat resistant adhesive tape, and, in such a state, further dried under vacuum at 200° C. for 12 hours to obtain a dry film. A test piece 4 mm wide×21 mm long was cut out from the dry film obtained, and using a dynamic viscoelasticity measuring apparatus (DVA-220 manufactured by IT Keisoku Seigyo Co., Ltd.) at a measuring length of 15 mm, a storage elastic modulus (E') was measured in the range from room temperature to 450° C. under the conditions of 110 Hz and a temperature rise rate of 4° C./min. At an inflection point of the storage elastic modulus (E') at this time, the temperature at the intersection of an extended baseline at or lower than a glass transition temperature and a tangent line showing a maximum slope at or higher than the inflection point was used as a glass transition temperature.

8. Porosity

A 10-cm square sample was provided, and its sample volume (cm$^3$) and mass (g) were measured; a porosity (%) was calculated from the results obtained using the following equation.

$$\text{Porosity} = (1 - \text{mass}/(\text{resin density} \times \text{sample volume})) \times 100$$

9. Evaluation of Curling Properties (Warpage)

A battery separator obtained in Examples and Comparative Examples was cut to a size of 100 mm wide×300 mm long. Static electricity was removed thoroughly with an antistatic brush, and then the sample was placed on a horizontally-disposed glass plate with the porous membrane B up. Both widthwise edges were then fixed by 10 mm, and a lift height at both lengthwise edges was measured. The average value was determined.

Example A-1

Synthesis of Heat Resistant Resin

Into a four-necked flask equipped with a thermometer, a cooling tube, and a nitrogen gas introduction tube, 1 mol of trimellitic acid anhydride (TMA), 0.8 mol of o-tolidine diisocyanate (TODI), 0.2 mol of 2,4-tolylene diisocyanate (TDI), and 0.01 mol of potassium fluoride were loaded together with N-methyl-2-pyrrolidone to a solids concentration of 20% and stirred at 100° C. for 5 hours, and then the resulting mixture was diluted with N-methyl-2-pyrrolidone to a solids concentration of 14% to synthesize a polyamide-imide resin solution (PI-a). The polyamide-imide resin obtained had a logarithmic viscosity of 1.35 dl/g and a glass transition temperature of 320° C.

The polyamide-imide resin solution (PI-a), alumina particles having an average diameter of 0.50 μm, and N-methyl-2-pyrrolidone were mixed at a weight ratio of 26:34:40, and the resulting mixture was placed into a polypropylene container together with zirconium oxide beads (trade name: "Torayceram" (registered trademark) beads available from TORAY INDUSTRIES, INC., diameter: 0.5 mm) and dispersed for 6 hours using a paint shaker (manufactured by Toyo Seiki Seisaku-Sho, Ltd.). The dispersion was then filtered through a filter with a filtration limit of 5 μm to prepare a varnish.

The varnish was applied to a porous membrane A (polypropylene, thickness: 9.0 μm, porosity: 40%, average pore size: 0.10 μm, and air resistance: 450 sec/100 cc Air) by blade coating. The coated membrane was passed through a low humidity zone at a temperature of 25° C. and an absolute humidity of 1.8 g/m$^3$ over 8 seconds, and then through a high humidity zone at a temperature of 25° C. and an absolute humidity of 12.0 g/m$^3$ over 5 seconds, immersed in an aqueous solution containing 5% by weight of N-methyl-2-pyrrolidone for 10 seconds, washed with pure water, and then passed through a hot-air drying furnace at 70° C. for drying to obtain a battery separator having a final thickness of 11.5 μm.

Example A-2

A battery separator was obtained in the same manner as in Example A-1 except that the absolute humidity in the low humidity zone was 4.0 g/m$^3$.

Example A-3

A battery separator was obtained in the same manner as in Example A-1 except that the absolute humidity in the low humidity zone was 5.5 g/m$^3$.

Example A-4

A battery separator was obtained in the same manner as in Example A-3 except that the absolute humidity in the high humidity zone was 7.0 g/m$^3$.

Example A-5

A battery separator was obtained in the same manner as in Example A-3 except that the absolute humidity in the high humidity zone was 16.0 g/m$^3$.

Example A-6

A battery separator was obtained in the same manner as in Example A-3 except that the mixing ratio of the polyamide-imide resin solution (PI-a), alumina particles having an average diameter of 0.50 μm, and N-methyl-2-pyrrolidone was 26:15:59 (weight ratio).

Example A-7

A battery separator was obtained in the same manner as in Example A-3 except that the mixing ratio of the polyamide-imide resin solution (PI-a), alumina particles having an average diameter of 0.50 μm, and N-methyl-2-pyrrolidone was 15:41:44 (weight ratio).

Example A-8

A battery separator was obtained in the same manner as in Example A-3 except that a polypropylene porous film having a thickness of 9.5 μm, a porosity of 40%, an average pore size of 0.15 μm, and an air resistance of 300 sec/100 cc Air was used as a porous film A.

Example A-9

A battery separator was obtained in the same manner as in Example A-3 except that a polypropylene porous film having a thickness of 7.0 μm, a porosity of 40%, an average pore size of 0.15 μm, and an air resistance of 220 sec/100 cc Air was used as a porous film A.

Example A-10

A battery separator was obtained in the same manner as in Example A-3 except that a polypropylene porous film having a thickness of 5.0 μm, a porosity of 40%, an average pore size of 0.15 μm, and an air resistance of 200 sec/100 cc Air was used as a porous film A.

Example A-11

A battery separator was obtained in the same manner as in Example A-3 except that the amount of the varnish was adjusted to a final thickness of 10.5 µm.

Example A-12

Into a four-necked flask equipped with a thermometer, a cooling tube, and a nitrogen gas introduction tube, 1 mol of trimellitic acid anhydride (TMA), 0.80 mol of o-tolidine diisocyanate (TODI), 0.20 mol of diphenylmethane-4,4'-diisocyanate (MDI), and 0.01 mol of potassium fluoride were loaded together with N-methyl-2-pyrrolidone to a solids concentration of 20% and stirred at 100° C. for 5 hours, and then the resulting mixture was diluted with N-methyl-2-pyrrolidone to a solids concentration of 14% to synthesize a polyamide-imide resin solution (b). The polyamide-imide resin obtained had a logarithmic viscosity of 1.05 dl/g and a glass transition temperature of 313° C.

A battery separator was obtained in the same manner as in Example A-3 except that a varnish comprising the polyamide-imide resin solution (PI-b) in place of the polyamide-imide resin solution (PI-a) was used.

Example A-13

Into a four-necked flask equipped with a thermometer, a cooling tube, and a nitrogen gas introduction tube, 1 mol of trimellitic acid anhydride (TMA), 0.60 mol of o-tolidine diisocyanate (TODI), 0.40 mol of diphenylmethane-4,4'-diisocyanate (MDI), and 0.01 mol of potassium fluoride were loaded together with N-methyl-2-pyrrolidone to a solids concentration of 20% and stirred at 100° C. for 5 hours, and then the resulting mixture was diluted with N-methyl-2-pyrrolidone to a solids concentration of 14% to synthesize a polyamide-imide resin solution (c). The polyamide-imide resin obtained had a logarithmic viscosity of 0.85 dl/g and a glass transition temperature of 308° C.

A battery separator was obtained in the same manner as in Example A-3 except that a varnish comprising the polyamide-imide resin solution (PI-c) in place of the polyamide-imide resin solution (PI-a) was used.

Example A-14

A battery separator was obtained in the same manner as in Example A-3 except that a varnish comprising titanium oxide particles (available from Titan Kogyo, Ltd., trade name: KR-380, average particle size: 0.38 µm) in place of alumina particles was used.

Example A-15

A battery separator was obtained in the same manner as in Example A-3 except that a polypropylene porous film having a thickness of 9.0 µm, a porosity of 38%, an average pore size of 0.15 µm, and an air resistance of 130 sec/100 cc Air was used as a porous film A.

Example A-16

A battery separator was obtained in the same manner as in Example A-3 except that a varnish comprising cross-linked polymer particles (polymethyl methacrylate cross-linked particles (product name: "Epostar" (registered trademark) MA, type 1002, available from NIPPON SHOKUBAI CO., LTD., average particle size: 2.50 µm)) in place of alumina particles was used.

Example A-17

The same varnish as in Example A-1 was applied to a corona-treated surface of a polyethylene terephthalate resin film having a thickness of 50 µm (E5101 available from TOYOBO CO., LTD.) by blade coating. The coated film was passed through a low humidity zone at a temperature of 25° C. and an absolute humidity of 1.8 g/m$^3$ over 8 seconds, and then through a high humidity zone at a temperature of 25° C. and an absolute humidity of 12 g/m$^3$ over 5 seconds. After 1.7 seconds, a porous film A (polypropylene, thickness: 9.0 µm, porosity: 45%, average pore size: 0.15 µm, and air resistance: 450 sec/100 cc Air) was laminated on the gel-like heat resistant resin surface described above, and the laminate was placed into an aqueous solution containing 5% by weight of N-methyl-2-pyrrolidone, washed with pure water, and then passed through a hot-air drying furnace at 70° C. for drying to obtain a battery separator having a final thickness of 11.5 µm.

Example A-18

A battery separator was obtained in the same manner as in Example A-3 except that a porous membrane having a three-layer structure of polypropylene/polyethylene/polypropylene (thickness: 9.0 µm (3.0 µm/3.0 µm/3.0 µm), porosity: 40%, average pore size: 0.10 µm, and air resistance: 400 sec/100 cc Air) was used as a porous film A.

Comparative Example A-1

A battery separator was obtained in the same manner as in Example A-3 except that the absolute humidity in the low humidity zone was 7.0 g/m$^3$.

Comparative Example A-2

A battery separator was obtained in the same manner as in Example A-3 except that the absolute humidity in the high humidity zone was 5.0 g/m$^3$.

Comparative Example A-3

Into a four-necked flask equipped with a thermometer, a cooling tube, and a nitrogen gas introduction tube, 1 mol of trimellitic acid anhydride (TMA), 0.76 mol of o-tolidine diisocyanate (TODI), 0.19 mol of 2,4-tolylene diisocyanate (TDI), and 0.01 mol of potassium fluoride were loaded together with N-methyl-2-pyrrolidone to a solids concentration of 20% and stirred at 100° C. for 5 hours, and then the resulting mixture was diluted with N-methyl-2-pyrrolidone to a solids concentration of 14% to synthesize a polyamide-imide resin solution (PI-d). The polyamide-imide resin obtained had a logarithmic viscosity of 0.45 dl/g and a glass transition temperature of 315° C.

A battery separator was obtained in the same manner as in Example A-3 except that a varnish comprising the polyamide-imide resin solution (PI-d) in place of the polyamide-imide resin solution (PI-a) was used.

Comparative Example A-4

A battery separator was obtained in the same manner as in Example A-3 except that a polypropylene porous membrane having a thickness of 10.0 μm, a porosity of 45%, an average pore size of 0.15 μm, and an air resistance of 450 sec/100 cc Air was used as a porous membrane A, and the absolute humidity was 18.4 g/m³ in both the low humidity zone and the high humidity zone.

Comparative Example A-5

A battery separator was obtained in the same manner as in Example A-3 except that the amount of the varnish was adjusted to a final thickness of 14.0 μm.

TABLE 1

| | Thickness of porous membrane A (μm) | Air permeability of porous membrane A (sec/100 ccAir) | Particle type | Particle size (μm) | Viscosity of heat resistant resin | Particle ratio | Absolute humidity of low humidity zone (g/m³) |
|---|---|---|---|---|---|---|---|
| Example A-1 | 9.0 | 450 | Alumina | 0.50 | 1.35 | 90.3% | 1.8 |
| Example A-2 | 9.0 | 450 | Alumina | 0.50 | 1.35 | 90.3% | 4.0 |
| Example A-3 | 9.0 | 450 | Alumina | 0.50 | 1.35 | 90.3% | 5.5 |
| Example A-4 | 9.0 | 450 | Alumina | 0.50 | 1.35 | 90.3% | 5.5 |
| Example A-5 | 9.0 | 450 | Alumina | 0.50 | 1.35 | 90.3% | 5.5 |
| Example A-6 | 9.0 | 450 | Alumina | 0.50 | 1.35 | 80.5% | 5.5 |
| Example A-7 | 9.0 | 450 | Alumina | 0.50 | 1.35 | 95.1% | 5.5 |
| Example A-8 | 9.5 | 300 | Alumina | 0.50 | 1.35 | 90.3% | 5.5 |
| Example A-9 | 7.0 | 220 | Alumina | 0.50 | 1.35 | 90.3% | 5.5 |
| Example A-10 | 5.0 | 200 | Alumina | 0.50 | 1.35 | 90.3% | 5.5 |
| Example A-11 | 8.0 | 450 | Alumina | 0.50 | 1.35 | 90.3% | 5.5 |
| Example A-12 | 9.0 | 450 | Alumina | 0.50 | 1.35 | 90.3% | 5.5 |
| Example A-13 | 9.0 | 450 | Alumina | 0.50 | 0.85 | 90.3% | 5.5 |
| Example A-14 | 9.0 | 450 | Titania | 0.38 | 1.35 | 90.3% | 5.5 |
| Example A-15 | 9.0 | 130 | Alumina | 0.50 | 1.35 | 90.3% | 5.5 |
| Example A-16 | 9.0 | 450 | Crosslinked polymer particle | 2.50 | 1.35 | 90.3% | 5.5 |
| Example A-17 | 9.0 | 450 | Alumina | 0.50 | 1.35 | 90.3% | 5.5 |
| Example A-18 | 9.0 | 400 | Alumina | 0.50 | 1.35 | 90.3% | 5.5 |
| Comparative Example A-1 | 9.0 | 450 | Alumina | 0.50 | 1.35 | 90.3% | 7.0 |
| Comparative Example A-2 | 9.0 | 450 | Alumina | 0.50 | 1.35 | 90.3% | 5.5 |
| Comparative Example A-3 | 9.0 | 450 | Alumina | 0.50 | 1.35 | 90.3% | 5.5 |
| Comparative Example A-4 | 10.0 | 450 | Alumina | 0.50 | 0.45 | 90.3% | 18.4 |
| Comparative Example A-5 | 9.0 | 450 | Alumina | 0.50 | 1.35 | 90.3% | 5.5 |

| | Absolute humidity of high humidity zone (g/m³) | Rising range of air resistance [Y-X] (sec/100 ccAir) | Variation of air resistance | Thickness of battery separator (μm) | Peeling strength (N/25 mm) | Curing (mm) |
|---|---|---|---|---|---|---|
| Example A-1 | 12.0 | 60 | 43 | 11.5 | 1.8 | 6 |
| Example A-2 | 12.0 | 55 | 45 | 11.5 | 1.7 | 6 |
| Example A-3 | 12.0 | 52 | 42 | 11.5 | 1.5 | 5 |
| Example A-4 | 7.0 | 70 | 47 | 11.5 | 1.9 | 7 |
| Example A-5 | 16.0 | 38 | 30 | 11.5 | 1.3 | 4 |
| Example A-6 | 12.0 | 69 | 48 | 11.5 | 2.3 | 8 |
| Example A-7 | 12.0 | 54 | 43 | 11.5 | 1.5 | 3 |
| Example A-8 | 12.0 | 67 | 42 | 11.5 | 2.2 | 5 |
| Example A-9 | 12.0 | 38 | 41 | 11.5 | 1.6 | 7 |
| Example A-10 | 12.0 | 33 | 40 | 11.5 | 1.4 | 8 |
| Example A-11 | 12.0 | 40 | 28 | 10.5 | 1.3 | 3 |
| Example A-12 | 12.0 | 80 | 46 | 11.5 | 2.3 | 4 |
| Example A-13 | 12.0 | 59 | 45 | 11.5 | 2.7 | 4 |
| Example A-14 | 12.0 | 60 | 47 | 11.5 | 1.8 | 6 |
| Example A-15 | 12.0 | 25 | 13 | 11.5 | 1.9 | 7 |
| Example A-16 | 12.0 | 52 | 43 | 11.5 | 2.0 | 8 |
| Example A-17 | 12.0 | 31 | 45 | 11.5 | 2.2 | 6 |
| Example A-18 | 12.0 | 31 | 46 | 11.5 | 2.1 | 6 |
| Comparative Example A-1 | 12.0 | 32 | 38 | 11.5 | 0.4 | 3 |
| Comparative Example A-2 | 5.0 | 105 | 73 | 11.5 | 2.4 | 10 |
| Comparative Example A-3 | 12.0 | 60 | 87 | 11.5 | 0.9 | 7 |
| Comparative Example A-4 | 18.4 | 58 | 48 | 11.5 | 0.8 | 5 |
| Comparative Example A-5 | 12.0 | 63 | 50 | 14.0 | 1.8 | 11 |

Note)
Crosslinked polymer particle:Crosslinked polymethylmethacrylate particle

Table 1 shows the properties of Examples A-1 to 18 and Comparative Examples A-1 to 5.

Example B-1

Preparation of Varnish

KF polymer #1120 (polyvinylidene fluoride available from KUREHA CORPORATION (melting point 175° C.), 12% N-methylpyrrolidone solution) was used as a fluororesin solution.

The polyvinylidene fluoride resin solution, alumina particles having an average diameter of 0.50 μm, and N-methyl-2-pyrrolidone were mixed at a weight ratio of 26:34:40, and the resulting mixture was placed into a polypropylene container together with zirconium oxide beads ("Torayceram" (registered trademark) beads available from TORAY INDUSTRIES, INC., diameter: 0.5 mm) and dispersed for 6 hours using a paint shaker (manufactured by Toyo Seiki Seisaku-Sho, Ltd.). The dispersion was then filtered through a filter with a filtration limit of 5 lam to prepare a varnish.

The varnish was applied to a porous membrane A (polypropylene, thickness: 9.0 μm, porosity: 40%, average pore size: 0.10 μm, and air resistance: 450 sec/100 cc Air) by blade coating. The coated membrane was passed through a low humidity zone at a temperature of 25° C. and an absolute humidity of 1.8 g/m$^3$ over 8 seconds, and then through a high humidity zone at a temperature of 25° C. and an absolute humidity of 12.0 g/m$^3$ over 5 seconds, immersed in an aqueous solution containing 5% by weight of N-methyl-2-pyrrolidone for 10 seconds, washed with pure water, and then passed through a hot-air drying furnace at 70° C. for drying to obtain a battery separator having a final thickness of 11.5 μm.

Example B-2

A battery separator was obtained in the same manner as in Example B-1 except that the absolute humidity in the low humidity zone was 4.0 g/m$^3$.

Example B-3

A battery separator was obtained in the same manner as in Example B-1 except that the absolute humidity in the low humidity zone was 5.5 g/m$^3$.

Example B-4

A battery separator was obtained in the same manner as in Example B-3 except that the absolute humidity in the high humidity zone was 7.0 g/m$^3$.

Example B-5

A battery separator was obtained in the same manner as in Example B-3 except that the absolute humidity in the high humidity zone was 16.0 g/m$^3$.

Example B-6

A battery separator was obtained in the same manner as in Example B-3 except that the mixing ratio of the polyvinylidene fluoride resin solution, alumina particles having an average diameter of 0.50 μm, and N-methyl-2-pyrrolidone used in Example B-1 was 26:15:59 (weight ratio).

Example B-7

A battery separator was obtained in the same manner as in Example B-3 except that the mixing ratio of the polyvinylidene fluoride resin solution, alumina particles having an average diameter of 0.50 μm, and N-methyl-2-pyrrolidone used in Example B-1 was 18:41:41 (weight ratio).

Example B-8

A battery separator was obtained in the same manner as in Example B-3 except that a polypropylene porous film having a thickness of 9.5 μm, a porosity of 40%, an average pore size of 0.15 μm, and an air resistance of 300 sec/100 cc Air was used as a porous film A.

Example B-9

A battery separator was obtained in the same manner as in Example B-3 except that a polypropylene porous film having a thickness of 7.0 μm, a porosity of 40%, an average pore size of 0.15 μm, and an air resistance of 220 sec/100 cc Air was used as a porous film A.

Example B-10

A battery separator was obtained in the same manner as in Example B-3 except that a polypropylene porous film having a thickness of 5.0 μm, a porosity of 40%, an average pore size of 0.15 μm, and an air resistance of 200 sec/100 cc Air was used as a porous film A.

Example B-11

A battery separator was obtained in the same manner as in Example B-3 except that the amount of the varnish was adjusted to a final thickness of 10.5 μm.

Example B-12

A battery separator was obtained in the same manner as in Example B-3 except that a varnish comprising titanium oxide particles (available from Titan Kogyo, Ltd., trade name "KR-380", average particle size: 0.38 μm) in place of alumina particles was used.

Example B-13

A battery separator was obtained in the same manner as in Example B-3 except that a polypropylene porous film having a thickness of 9.0 μm, a porosity of 38%, an average pore size of 0.15 μm, and an air resistance of 130 sec/100 cc Air was used as a porous film A.

Example B-14

A battery separator was obtained in the same manner as in Example B-3 except that a varnish comprising cross-linked polymer particles (polymethyl methacrylate cross-linked particles (product name: "Epostar" (registered trademark) MA, type 1002, available from NIPPON SHOKUBAI CO., LTD., average particle size: 2.5 μm)) in place of alumina particles was used.

Example B-15

The same varnish as in Example B-1 was applied to a corona-treated surface of a polyethylene terephthalate resin film having a thickness of 50 μm (E5101 available from TOYOBO CO., LTD.) by blade coating. The coated film was passed through a low humidity zone at a temperature of 25° C.

and an absolute humidity of 1.8 g/m³ over 8 seconds, and then through a high humidity zone at a temperature of 25° C. and an absolute humidity of 12.0 g/m³ over 5 seconds. After 1.7 seconds, a porous film A (polypropylene, thickness: 9.0 µm, porosity: 45%, average pore size: 0.15 µm, and air resistance: 450 sec/100 cc Air) was laminated on the gel-like heat resistant resin surface described above, and the laminate was placed into an aqueous solution containing 5% by weight of N-methyl-2-pyrrolidone, washed with pure water, and then passed through a hot-air drying furnace at 70° C. for drying to obtain a battery separator having a final thickness of 11.5 µm.

Example B-16

A battery separator was obtained in the same manner as in Example B-3 except that a porous membrane having a three-layer structure of polypropylene/polyethylene/polypropylene (thickness: 9.0 µm (3.0 µm/3.0 µm/3.0 µm), porosity: 40%, average pore size: 0.10 µm, and air resistance: 400 sec/100 cc Air was used as a porous film A.

Comparative Example B-1

A battery separator was obtained in the same manner as in Example B-3 except that the absolute humidity in the low humidity zone was 7.0 g/m³.

Comparative Example B-2

A battery separator was obtained in the same manner as in Example B-3 except that the absolute humidity in the high humidity zone was 5.0 g/m³.

Comparative Example B-3

A battery separator was obtained in the same manner as in Example B-3 except that a polypropylene porous membrane having a thickness of 10.0 µm, a porosity of 45%, an average pore size of 0.15 µm, and an air resistance of 450 sec/100 cc Air was used as a porous membrane A, and the absolute humidity was 18.4 g/m³ in both the low humidity zone and the high humidity zone.

Comparative Example B-4

A battery separator was obtained in the same manner as in Example B-3 except that the amount of the varnish was adjusted to a final thickness of 14.0 µm.

TABLE 2

| | Thickness of porous membrane A (µm) | Air permeability of porous membrane A (sec/100 ccAir) | Particle type | Particle size (µm) | Particle ratio | Absolute humidity of low humidity zone (g/m³) |
|---|---|---|---|---|---|---|
| Example B-1 | 9.0 | 450 | Alumina | 0.50 | 90.3% | 1.8 |
| Example B-2 | 9.0 | 450 | Alumina | 0.50 | 90.3% | 4.0 |
| Example B-3 | 9.0 | 450 | Alumina | 0.50 | 90.3% | 5.5 |
| Example B-4 | 9.0 | 450 | Alumina | 0.50 | 90.3% | 5.5 |
| Example B-5 | 9.0 | 450 | Alumina | 0.50 | 90.3% | 5.5 |
| Example B-6 | 9.0 | 450 | Alumina | 0.50 | 80.5% | 5.5 |
| Example B-7 | 9.0 | 450 | Alumina | 0.50 | 95.1% | 5.5 |
| Example B-8 | 9.5 | 300 | Alumina | 0.50 | 90.3% | 5.5 |
| Example B-9 | 7.0 | 220 | Alumina | 0.50 | 90.3% | 5.5 |
| Example B-10 | 5.0 | 200 | Alumina | 0.50 | 90.3% | 5.5 |
| Example B-11 | 9.0 | 450 | Alumina | 0.50 | 90.3% | 5.5 |
| Example B-12 | 9.0 | 450 | Titania | 0.38 | 90.3% | 5.5 |
| Example B-13 | 9.0 | 130 | Alumina | 0.50 | 90.3% | 5.5 |
| Example B-14 | 9.0 | 450 | Crosslinked polymer particle | 2.50 | 90.3% | 5.5 |
| Example B-15 | 9.0 | 450 | Alumina | 0.50 | 90.3% | 5.5 |
| Example B-16 | 9.0 | 400 | Alumina | 0.50 | 90.3% | 5.5 |
| Comparative Example B-1 | 9.0 | 450 | Alumina | 0.50 | 90.3% | 7.0 |
| Comparative Example B-2 | 9.0 | 450 | Alumina | 0.50 | 90.3% | 5.5 |
| Comparative Example B-3 | 10.0 | 450 | Alumina | 0.50 | 90.3% | 18.4 |
| Comparative Example B-4 | 9.0 | 450 | Alumina | 0.50 | 90.8% | 5.5 |

| | Absolute humidity of high humidity zone (g/m³) | Rising range of air resistance [Y-X] (sec/100 ccAir) | Variation of air resistance | Thickness of battery separator (µm) | Peeling strength (N/25 mm) | Curing (mm) |
|---|---|---|---|---|---|---|
| Example B-1 | 12.0 | 59 | 44 | 11.5 | 1.8 | 5 |
| Example B-2 | 12.0 | 54 | 45 | 11.5 | 1.7 | 6 |
| Example B-3 | 12.0 | 53 | 43 | 11.5 | 1.6 | 5 |
| Example B-4 | 7.0 | 69 | 47 | 11.5 | 1.8 | 7 |
| Example B-5 | 16.0 | 33 | 31 | 11.5 | 1.2 | 3 |
| Example B-6 | 12.0 | 68 | 46 | 11.5 | 2.2 | 8 |
| Example B-7 | 12.0 | 55 | 44 | 11.5 | 1.3 | 2 |
| Example B-8 | 12.0 | 67 | 41 | 11.5 | 2.1 | 5 |
| Example B-9 | 12.0 | 38 | 42 | 11.5 | 1.5 | 7 |
| Example B-10 | 12.0 | 34 | 40 | 11.5 | 1.3 | 7 |
| Example B-11 | 12.0 | 40 | 29 | 10.5 | 1.3 | 3 |
| Example B-12 | 12.0 | 59 | 48 | 11.5 | 1.7 | 6 |

TABLE 2-continued

| | | | | | | |
|---|---|---|---|---|---|---|
| Example B-13 | 12.0 | 24 | 15 | 11.5 | 1.8 | 6 |
| Example B-14 | 12.0 | 51 | 43 | 11.5 | 1.9 | 8 |
| Example B-15 | 12.0 | 30 | 46 | 11.5 | 2.2 | 8 |
| Example B-16 | 12.0 | 31 | 47 | 11.5 | 2.0 | 5 |
| Comparative Example B-1 | 12.0 | 32 | 39 | 11.5 | 0.3 | 3 |
| Comparative Example B-2 | 5.0 | 107 | 77 | 11.5 | 2.2 | 10 |
| Comparative Example B-3 | 18.4 | 58 | 49 | 11.5 | 0.8 | 5 |
| Comparative Example B-4 | 12.0 | 64 | 53 | 14.0 | 1.6 | 12 |

Note)
Crosslinked polymer particle:Crosslinked polymethylmethacrylate particle

Table 2 shows the properties of Examples B-1 to 17 and Comparative Examples B-1 to 4.

INDUSTRIAL APPLICABILITY

The battery separator of the present invention is a battery separator that has a balance between excellent adhesion of a heat resistant resin layer and a small amount of air resistance increase even when membranes become thinner and thinner in the future, and is suitable for increase in battery capacity, excellent ion permeability, and high-speed processability in a battery assembly process.

The invention claimed is:

1. A battery separator comprising: a porous membrane A comprising a polypropylene resin, and a porous membrane B laminated thereon comprising a heat resistant resin and inorganic particles or cross-linked polymer particles, wherein the porous membrane A satisfies expressions (a) to (c), the battery separator satisfies expressions (d) to (f), and the heat resistant resin comprises a vinylidene fluoride homopolymer:

$$t(A) < 10 \mu m \quad (a)$$

wherein t (A) is a thickness of the porous membrane A;

$$0.01 \mu m \leq R(A) \leq 1.0 \mu m \quad (b)$$

wherein R (A) is an average pore size of the porous membrane A;

$$30\% \leq V(A) \leq 70\% \quad (c)$$

wherein V (A) is a porosity of the porous membrane A:

$$t(T) \leq 13 \mu m \quad (d)$$

wherein t (T) is a thickness of the entire battery separator;

$$F(A/B) \geq 1.0 \text{ N}/25 \text{ mm} \quad (e)$$

wherein F (A/B) is a peeling strength at an interface between the porous membrane A and the porous membrane B; and $$20 \leq Y-X \leq 100 \quad (f)$$

wherein X is an air resistance (sec/100 cc Air) of the porous membrane A, and
Y is an air resistance (sec/100 cc Air) of the battery separator.

2. The battery separator according to claim 1, wherein the battery separator has an air resistance of 50 to 600 sec/100 cc Air.

3. A process of producing the battery separator according to claim 1, comprising steps (i) and (ii):
(i): applying a varnish comprising the heat resistant resin, which comprises the vinylidene fluoride homopolymer, and inorganic particles or cross-linked polymer particles to the porous membrane A comprising the polypropylene resin, and then passing the porous membrane A through a low humidity zone at an absolute humidity of not less than 0.5 g/m³ and less than 6.0 g/m³ and a high humidity zone at an absolute humidity of not less than 7.0 g/m³ and less than 25.0 g/m³ to form a heat resistant resin membrane on the porous membrane A; and
(ii): immersing the composite membrane obtained in step (i), in which the heat resistant resin membrane is laminated, in a coagulation bath to convert the heat resistant resin membrane into the porous membrane B, and washing and drying the porous membrane B to obtain the battery separator.

4. A process of producing the battery separator according to claim 2, comprising steps (i) and (ii):
(i): applying a varnish comprising the heat resistant resin which comprises the vinylidene fluoride homopolymer and inorganic particles or cross-linked polymer particles to the porous membrane A comprising the polypropylene resin, and then passing the porous membrane A through a low humidity zone at an absolute humidity of not less than 0.5 g/m³ and less than 6.0 g/m³ and a high humidity zone at an absolute humidity of not less than 7.0 g/m³ and less than 25.0 g/m³ to form a heat resistant resin membrane on the porous membrane A; and
(ii): immersing the composite membrane obtained in step (i), in which the heat resistant resin membrane is laminated, in a coagulation bath to convert the heat resistant resin membrane into the porous membrane B, and washing and drying the porous membrane B to obtain the battery separator.

5. A battery separator obtained by a process comprising (i) and (ii):
(i): applying a varnish comprising a heat resistant resin which comprises a fluororesin vinylidene fluoride homopolymer and inorganic particles or cross-linked polymer particles to a porous membrane A comprising a polypropylene resin, and passing the porous membrane A through a low humidity zone at an absolute humidity of not less than 0.5 g/m³ and less than 6.0 g/m³ and a high humidity zone at an absolute humidity of not less than 7.0 g/m³ and less than 25.0 g/m³ to form a heat resistant resin membrane on the porous membrane A; and
(ii): immersing the composite membrane obtained in (i), in which the heat resistant resin membrane is laminated, converting the heat resistant resin membrane into a porous membrane B in a coagulation bath, and washing and drying the porous membrane B to obtain the battery separator, wherein the battery separator comprises the porous membrane A comprising the polypropylene resin, and the porous membrane B laminated thereon comprising the heat resistant resin and inorganic particles or cross-linked polymer particles, wherein the porous membrane A satisfies expressions (a) to (c), the battery separator satisfies expressions (d) to (f), and the heat resistant resin comprises the vinylidene fluoride homopolymer:

$$t(A) < 10 \ \mu m \quad (a)$$

wherein t (A) is a thickness of the porous membrane A;

$$0.01 \ \mu m \leq R(A) \leq 10 \ \mu m \quad (b)$$

wherein R (A) is an average pore size of the porous membrane A;

$$30\% \leq V(A) \leq 70\% \quad (c)$$

wherein V (A) is a porosity of the porous membrane A:

$$t(T) \leq 13 \ \mu m \quad (d)$$

wherein t (T) is a thickness of the entire battery separator;

$$F(A/B) \geq 1.0 \ N/25 \ mm \quad (e)$$

wherein F (A/B) is a peeling strength at the interface between the porous membrane A and the porous membrane B; and $$20 \leq Y - X \leq 100 \quad (f)$$

wherein X is an air resistance (sec/100 cc Air) of the porous membrane A, and
Y is an air resistance (sec/100 cc Air) of the battery separator.

* * * * *